R. E. BEEBE.
SURVEYING INSTRUMENT.
APPLICATION FILED OCT. 8, 1912.

1,086,124.

Patented Feb. 3, 1914.

Witnesses
Robt Meyer.
L. C. Barkley

Inventor
Royden E. Beebe,
By Franks Ankerman,
Attorney

UNITED STATES PATENT OFFICE.

ROYDEN E. BEEBE, OF THE UNITED STATES ARMY.

SURVEYING INSTRUMENT.

1,086,124.

Specification of Letters Patent.

Patented Feb. 3, 1914.

Application filed October 8, 1912. Serial No. 724,625.

*To all whom it may concern:*

Be it known that I, ROYDEN E. BEEBE, a citizen of the United States of America, of the United States Army, stationed at Fort Leavenworth, in the county of Leavenworth and State of Kansas, have invented certain new and useful Improvements in Surveying Instruments, of which the following is a specification.

This invention relates to surveying instruments broadly and particularly to an attachment comprising novel means for dividing a field for the purpose of measuring horizontal angles or for the purpose of measuring vertical angles.

An object of this invention is to provide means which may be associated with field glasses, telescopes, transit telescopes, level telescopes, battery commander telescopes, tubes, telescopic or nontelescopic and the like for viewing the foreground or distant ground and calculating angles through the use of marks or markers indicating degrees, mils, gradients, percentage or other divisions of space within the field of the objective glass of the instrument.

A further object of the invention is to provide a square or rectangular objective glass having indications or lines associated therewith for dividing the objects observable through the objective glass and having the level line centrally disposed with relation to the area of the objective glass, the invention further consisting in novel means for securing the rectangular or square objective glass in fixed relation to the tube or case of the instrument, thereby preventing shifting of the marks or graduations on the said objective glass with relation to the means for determining the location of the instrument with respect to the horizontal or other position.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
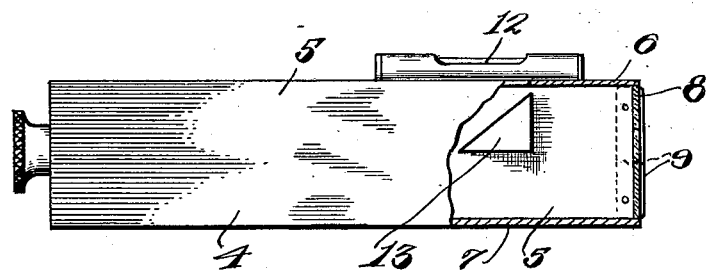
Figure 2:
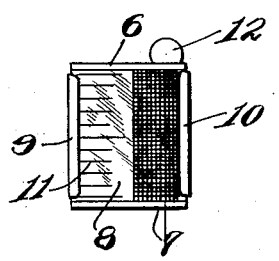
Figure 3:
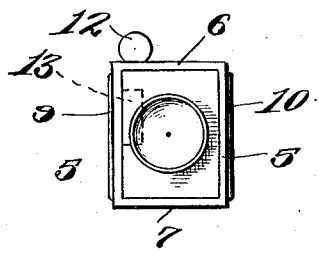

Figure 1 illustrates a view in side elevation of a device embodying the invention, the same being broken away to show the end containing the objective glass in section; and Fig. 2 illustrates an end view thereof. Fig. 3 illustrates a view of the opposite end of my invention as illustrated in Fig. 1.

In these drawings 4 denotes the tube, barrel or casing such as could be utilized in connection with an apparatus of this type but hereinafter reference will be made to this element as a tube and it is to be understood that by such term the inventor intends to include any case, body, or element capable of use in connection with apparatus of the type indicated.

The tube is preferably square or rectangular in cross section and two opposed walls as for instance the side walls 5 as shown in the drawing are slightly shorter than the top and bottom walls which are respectively numbered 6 and 7 and the distance which the top and bottom walls extend beyond the side walls is preferably approximately equal to the thickness of the objective glass 8 and the clips 9 and 10 which retain the objective glass in the seat formed by the ends of the side walls and by the inner surfaces of the top and bottom walls, by reason of which construction, the objective glass is held firmly in place, thus preventing any shifting of the objective glass and the graduations 11 thereon which divide the field into degrees or divisions as heretofore stated. As shown in the drawing, the objective glass is provided with degree marks consisting of a line extending transversely of the vertical center and a series of shorter lines above and below the centrally disposed line whereby the objective glass is divided into degrees for giving degrees of an arc to enable an observer to measure the vertical angle of all objects within the field above or below the level line which level line is the horizontally disposed line in the vertical center of the field. It is to be understood that a bubble glass 12 is associated with the tube and the tube is provided with a prism 13 standing in such relation to the graduations on the objective glass as to enable the observer to see the bubble with relation to the central line of graduations, so that the observer will know that when the bubble and the central line of the graduations aline, the tube is in a horizontal position. Strings, wires or cross hairs may be substituted for the degree marks on the glass.

The clips 9 and 10 are here shown as comprising metallic plates secured to the outer surface of the sides of the tube at the end thereof containing the objective glass, the said plates having their edges bent at right angles to the sides of the tube to overlie portions of the objective glass for the purpose of retaining it in its seat and for protecting the edges thereof.

The divisions or graduations are shown as being provided on the side of the objective glass in order to enable the observer to measure the vertical angle of all objects within the field, above or below the level line.

While I have referred to the glass as being used in connection with a bubble tube, it is to be understood that this invention is applicable as well to an instrument in which the level is determined by pendulum or other equivalent means. The means for effecting the graduation of the field of view, for dividing said field of view may be of any appropriate type but are here shown as being applied to the objective glass.

I claim—

In a non-telescopic instrument for measuring angles and the like, a tube provided with a sight piece, an objective glass associated with the tube visible through the sight piece, said objective glass having graduations thereon occupying the main field, a level indicator exposed interiorly of the tube, and means for reflecting the level indicator and the graduations on the main field of the objective glass for co-relating the said level indicator and the said graduations.

In testimony whereof, I hereunto affix my signature in the presence of two witnesses.

ROYDEN E. BEEBE.

Witnesses:
E. N. FESLER,
L. B. GEIGER.

---

Copies of this patent may be obtained for five cents each, by addressing the "Commissioner of Patents, Washington, D. C."